United States Patent
Takeuchi

(10) Patent No.: US 11,894,954 B2
(45) Date of Patent: Feb. 6, 2024

(54) RECEIVER DEVICE AND RECEPTION METHOD

(71) Applicant: Kioxia Corporation, Tokyo (JP)

(72) Inventor: Tomohiko Takeuchi, Funabashi (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/807,200

(22) Filed: Jun. 16, 2022

(65) Prior Publication Data

US 2023/0188387 A1    Jun. 15, 2023

(30) Foreign Application Priority Data

Dec. 13, 2021  (JP) .................................. 2021-201783

(51) Int. Cl.
*H04L 25/03*  (2006.01)
*H04B 1/18*  (2006.01)

(52) U.S. Cl.
CPC ......... *H04L 25/03057* (2013.01); *H04B 1/18* (2013.01); *H04L 25/03847* (2013.01)

(58) Field of Classification Search
CPC ............... H04B 1/18; H04L 25/03006; H04L 25/03019; H04L 25/03057; H04L 25/03847; H04L 25/03885
USPC ........ 375/229, 232, 233, 348, 350; 708/322, 708/323
See application file for complete search history.

(56) References Cited

U.S. PATENT DOCUMENTS

| | | | |
|---|---|---|---|
| 8,588,289 B2 | 11/2013 | Rane et al. | |
| 9,191,244 B2 | 11/2015 | Tan et al. | |
| 9,438,450 B1* | 9/2016 | Kang | H04L 25/03057 |
| 10,079,697 B1* | 9/2018 | Kang | H04L 25/03057 |
| 10,742,458 B2 | 8/2020 | Fujii et al. | |
| 2010/0135378 A1* | 6/2010 | Lin | H04L 7/0058 375/232 |
| 2016/0099819 A1* | 4/2016 | Ogata | H04B 1/16 375/233 |
| 2017/0187552 A1* | 6/2017 | Sakai | H04L 25/03057 |
| 2021/0297295 A1* | 9/2021 | Fujii | G11C 7/1084 |

FOREIGN PATENT DOCUMENTS

| | | |
|---|---|---|
| JP | 2014-143672 A | 8/2014 |
| JP | 5638134 B2 | 12/2014 |
| JP | 2019-33476 A | 2/2019 |

* cited by examiner

*Primary Examiner* — Young T. Tse
(74) *Attorney, Agent, or Firm* — Oblon, McClelland, Maier & Neustadt, L.L.P.

(57) ABSTRACT

A receiver device according to an embodiment includes a equalizer, a sampler, and a controller. The equalizer receive a first signal. The equalizer boosts the first signal to output a resultant as a second signal. The sampler samples the second signal. The sampler outputs a sampling result of the second signal as a first digital signal. The controller executes adaptive processing for adapting an amount of boost of the first signal. In the adaptive processing, the controller is configured to: adjust an amount of boost for the equalizer based on inter-symbol interference of a part in the first digital signal, the part matching a data pattern of a set pattern filter; and dynamically change a pattern filter to be set according to the amount of boost for the equalizer.

20 Claims, 10 Drawing Sheets

| Pattern filter | Combination of cursors | Data | | | | | |
|---|---|---|---|---|---|---|---|
| | | h[−1] | h[0] | h[1] | h[2] | h[3] | h[4] |
| PF1 | h[1]+h[2] | 0 | 1 | 0 | 0 | * | * |
| PF2 | h[2]+h[3] | 0 | 1 | * | 0 | 0 | * |
| PF3 | h[1]+h[2]+h[3] | 0 | 1 | 0 | 0 | 0 | * |
| PF4 | h[2]+h[3]+h[4] | 0 | 1 | * | 0 | 0 | 0 |

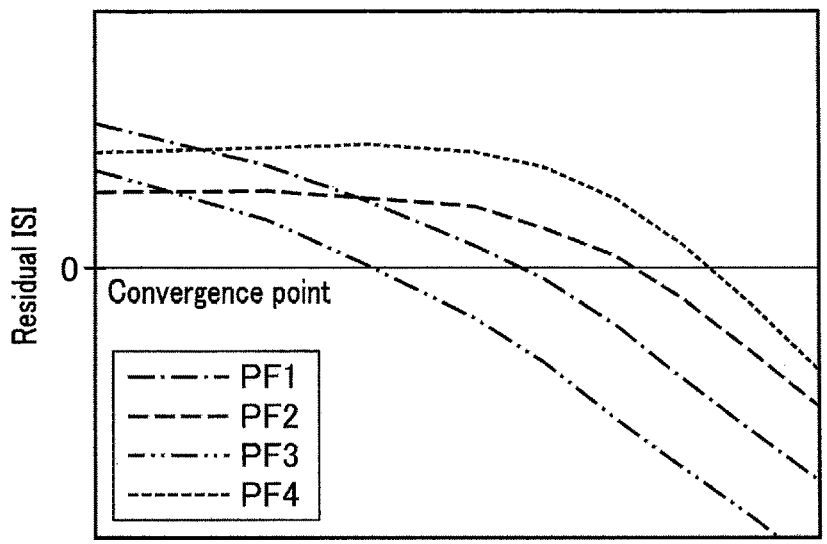
F I G. 11
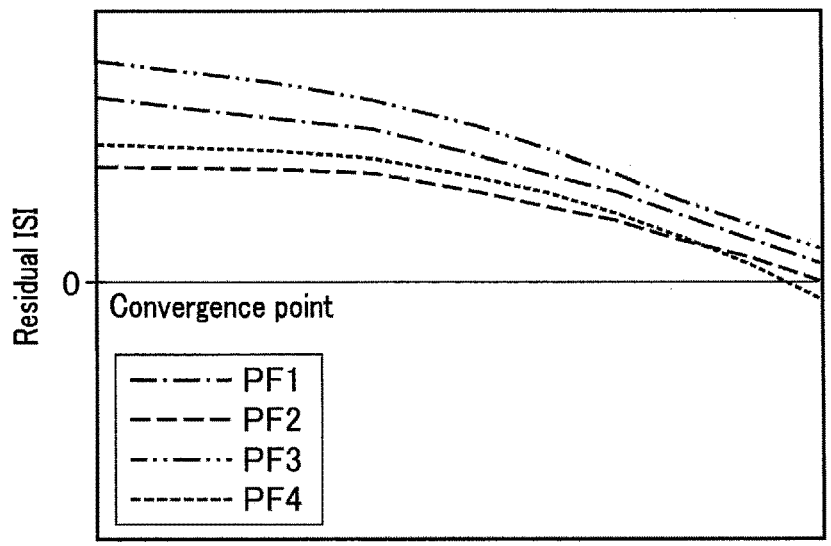
F I G. 12
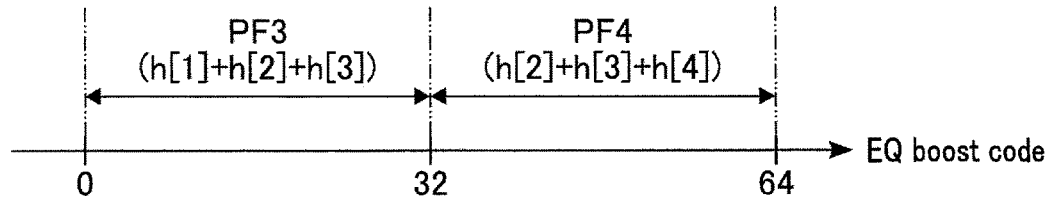
F I G. 13

| DATA | | | | | | EDGE | | EQ boost code |
|---|---|---|---|---|---|---|---|---|
| d[-1] | d[0] | d[1] | d[2] | d[3] | d[4] | e[-1] | e[0] | |
| 0 | 1 | 0 | 0 | 0 | 0 | 0 | 0 | +1 |
| | | | | | | 1 | 1 | -1 |
| Others | | | | | | | | No change |

| DATA | | | | ERR | EQ boost code | VREF code |
|---|---|---|---|---|---|---|
| h[0] | h[1] | h[2] | h[3] | h[0] | | |
| 1 | 1 | 1 | 1 | 1 | – | +1 |
| | | | | 0 | – | –1 |
| 1 | 0 | 0 | 0 | 1 | –1 | – |
| | | | | 0 | +1 | – |
| Others | | | | | No change | |

RECEIVER DEVICE AND RECEPTION METHOD

CROSS-REFERENCE TO RELATED APPLICATIONS

This application is based upon and claims the benefit of priority from Japanese Patent Application No. 2021-201783, filed Dec. 13, 2021, the entire contents of which are incorporated herein by reference.

FIELD

Embodiments described herein relate generally to a receiver device and a reception method.

BACKGROUND

A receiver device is connected to a transmitter device via a transmission line. The transmitter device transmits a signal to the receiver device via the transmission line. The receiver device receives a signal that has suffered a loss due to passage through the transmission line. The receiver device includes an equalizer circuit that compensates for the loss of the received signal. When receiving the signal sent by the transmitter device, the receiver device executes adaptive processing for adapting compensation setting of the signal by the equalizer circuit to the loss of the received signal.

BRIEF DESCRIPTION OF THE DRAWINGS

FIG. 11 is a graph illustrating an example of a relationship between a residual ISI and an EQ boost code for each pattern filter in a low-loss environment;

FIG. 12 is a graph illustrating an example of a relationship between a residual ISI and an EQ boost code for each pattern filter in a high-loss environment;

FIG. 13 is a schematic diagram illustrating an example of a method for switching between pattern filters in the receiver device according to the first embodiment;

DETAILED DESCRIPTION

Figure 1:
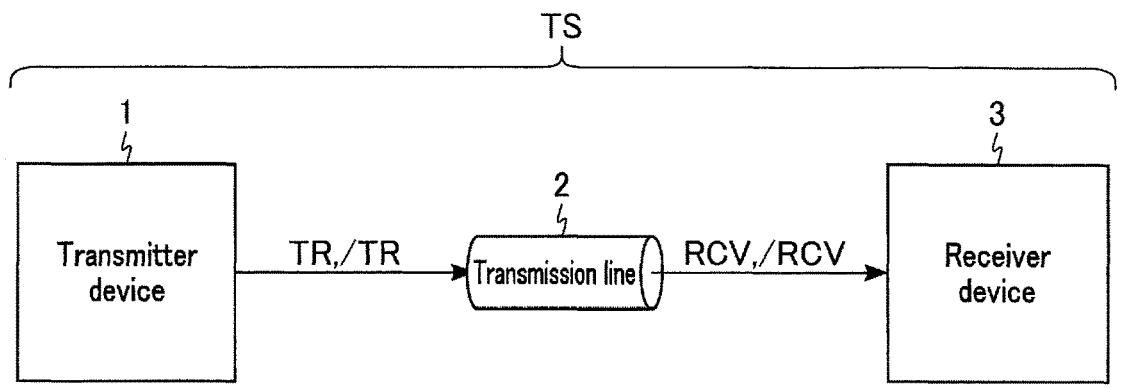
FIG. 1 is a block diagram illustrating an example of a configuration of a transmission system including a receiver device according to a first embodiment.

In general, according to one embodiment, a receiver device according to an embodiment includes a first equalizer circuit, a first sampler circuit, and a control circuit. The first equalizer circuit receive a first signal from outside. The first equalizer circuit boosts the first signal to output a resultant as a second signal. The first sampler circuit samples the second signal. The first sampler circuit outputs a sampling result of the second signal as a first digital signal. The control circuit executes adaptive processing for adapting an amount of boost of the first signal by the first equalizer circuit to a loss of the first signal. In the adaptive processing, the control circuit is configured to: adjust an amount of boost for the first equalizer circuit based on inter-symbol interference of a part in the first digital signal, the part matching a data pattern of a set pattern filter; and dynamically change a pattern filter to be set according to the amount of boost for the first equalizer circuit.

Hereinafter, embodiments are described with reference to the drawings. Each embodiment exemplifies a device and a method for embodying the technical idea of the invention. The drawings are schematic or conceptual. In the following description, constituent elements having substantially the same functions and configurations are denoted with a common reference numeral. A "hyphen+number" or "alphabet" added to a reference numeral is referred to by the same reference numeral, and is used to distinguish between similar elements. A signal name to which "/" is appended at its head indicates that the signal is an inversion signal.

[1] First Embodiment

Hereinafter, a receiver device 3 according to the first embodiment is described.

[1-1] Configuration

[1-1-1] Configuration of Transmission System TS

FIG. 1 is a block diagram illustrating an example of the configuration of the transmission system TS including the receiver device 3 according to the first embodiment. The transmission system TS transmits data from one device to another device via high-speed serial communications. As illustrated in FIG. 1, the transmission system TS includes a transmitter device 1, a transmission line 2, and the receiver device 3. In the transmission system TS, the transmitter device 1 is connected to the receiver device 3 via the transmission line 2.

The transmitter device 1 includes a semiconductor integrated circuit capable of encoding and transmitting information (data). The transmitter device 1 inputs the encoded information to the transmission line 2 as sent signals TR and /TR. The sent signals TR and /TR are differential signals, for example, pulse signals. Each pulse included in the sent signals TR and /TR corresponds to modulated data. As a method for modulating data, for example, pulse-amplitude modulation is used. The pulse-amplitude modulation is a modulation method in which data is transmitted by voltages (amplitudes) of pulses at regular intervals. In a case where the pulse-amplitude modulation is used as the method for modulating data, the voltage level of each pulse of the sent signals TR and /TR corresponds to 1-bit data or multiple-bits data. In the following description, a case where 1-bit data is modulated into one pulse is described.

The transmission line 2 is a structural or spatial transmission medium for transmitting the sent signals TR and /TR from the transmitter device 1 to the receiver device 3. The transmission line 2 includes, for example, wiring that connects the transmitter device 1 to the receiver device 3. The transmission line 2 has transmission characteristics according to the structure and material of the transmission medium. The sent signals TR and /TR inputted to the transmission line 2 pass through the transmission line 2 to suffer a loss according to the transmission characteristics (frequency characteristics, for example) of the transmission line 2. The sent signals TR and /TR that have passed through the transmission line 2 are outputted as received signals RCV and /RCV to the receiver device 3. The sent signals TR and /TR and the received signals RCV and /RCV are processed as analog signals.

The receiver device 3 includes a semiconductor integrated circuit capable of decoding information from a received signal. The receiver device 3 receives the received signals RCV and /RCV outputted from the transmission line 2. The received signals RCV and /RCV are differential signals and correspond to the sent signals TR and /TR that have suffered a loss according to the transmission characteristics of the transmission line 2. The receiver device 3 compensates for the loss of the received signals RCV and /RCV and decodes the information contained in the sent signals TR and /TR. When receiving the received signals RCV and /RCV, the receiver device 3 executes adaptive processing for adapting settings related to the compensation of the received signals RCV and /RCV to the loss of the received signals RCV and /RCV.

Figure 2:
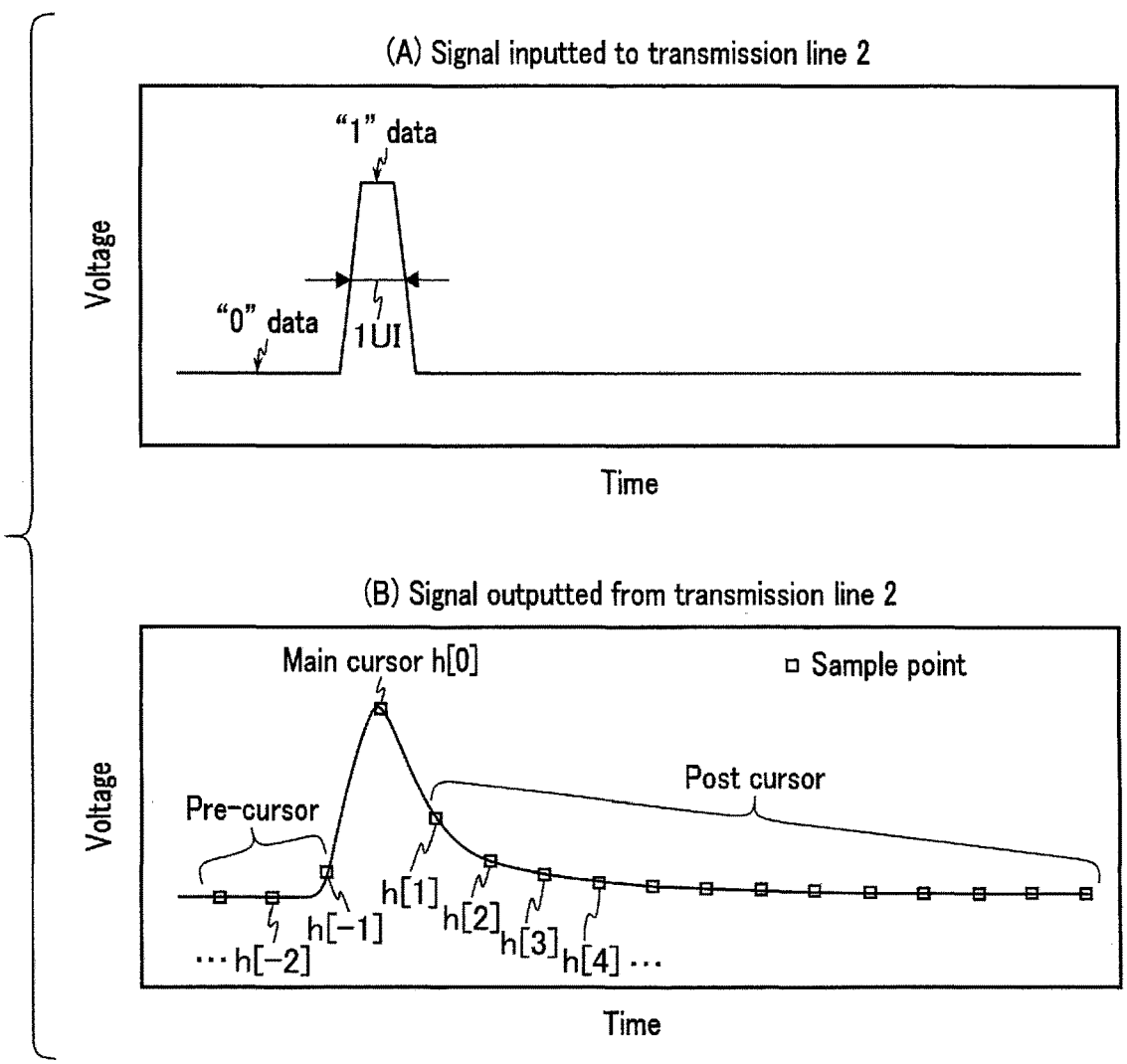
FIG. 2 is a waveform diagram illustrating an example of a signal inputted to a transmission line and a signal outputted from the transmission line.

FIG. 2 is a waveform diagram illustrating an example of a signal inputted to the transmission line 2 and a signal outputted from the transmission line 2. The vertical axis of the waveform diagram illustrated in FIG. 2 represents a signal voltage (amplitude). The horizontal axis of the waveform diagram illustrated in FIG. 2 represents a time. (A) of FIG. 2 illustrates an example of signals inputted to the transmission line 2, that is, the sent signals TR and /TR. (B) of FIG. 2 illustrates an example of signals outputted from the transmission line 2, that is, the received signals RCV and /RCV.

In a case where the transmitter device 1 transmits information in which one set of "1" data is inserted between consecutive sets of "0" data, a waveform of the sent signals TR and /TR is, for example, the waveform illustrated in (A) of FIG. 2. In the present example, a voltage of a portion corresponding to "1" data is higher than a voltage of a portion corresponding to "0" data. The portion corresponding to "1" data is a pulse signal with a sharp edge. Further, for example, a half width of the pulse of the portion corresponding to "1" data corresponds to a "1 UI (Unit Interval)". The 1 UI is a time corresponding to one cycle of a clock signal for capturing data.

In a case where the sent signals TR and /TR illustrated in (A) of FIG. 2 pass through the transmission line 2, a waveform of the received signals RCV and /RCV outputted from the transmission line 2 is, for example, the waveform illustrated in (B) of FIG. 2. Square plots added to (B) of FIG. 2 correspond to sample points sampled based on a clock signal of a particular frequency. In the present example, a main cursor h[0] is set in a portion corresponding to "1" data of the waveform. Numerical values added to cursors are defined such that, with respect to the time at which the main cursor h[0] is set, positive values are set for older cursors and negative values are set for newer cursors. Hereinafter, h[−1], h[−2], . . . , and so on are referred to as "pre-cursors", and h[1], h[2], . . . , and so on are referred to as "post cursors".

The transmission characteristics of the transmission line 2 have characteristics such as those of a low-pass filter that removes a high-frequency component. Therefore, the sent signals TR and /TR pass through the transmission line 2 to be converted into the received signals RCV and /RCV in which the high-frequency component is lost. In other words, the received signals RCV and /RCV have waveforms with blunted edges in response to the loss due to the transmission line 2, as compared with the sent signals TR and /TR. As a result, inter-symbol interference (ISI) may occur in the sent signals TR and /TR that have passed through the transmission line 2. The ISI is a phenomenon in which waveforms affect each other between unit intervals (pulses) that originally have individual sets of data and are temporally adjacent to each other. In a signal in which the number of consecutive "0" data and the number of consecutive "1" data change randomly, signal deterioration due to the ISI may occur under the influence of the transmission line 2.

[1-1-2] Configuration of Receiver Device 3

Figure 3:
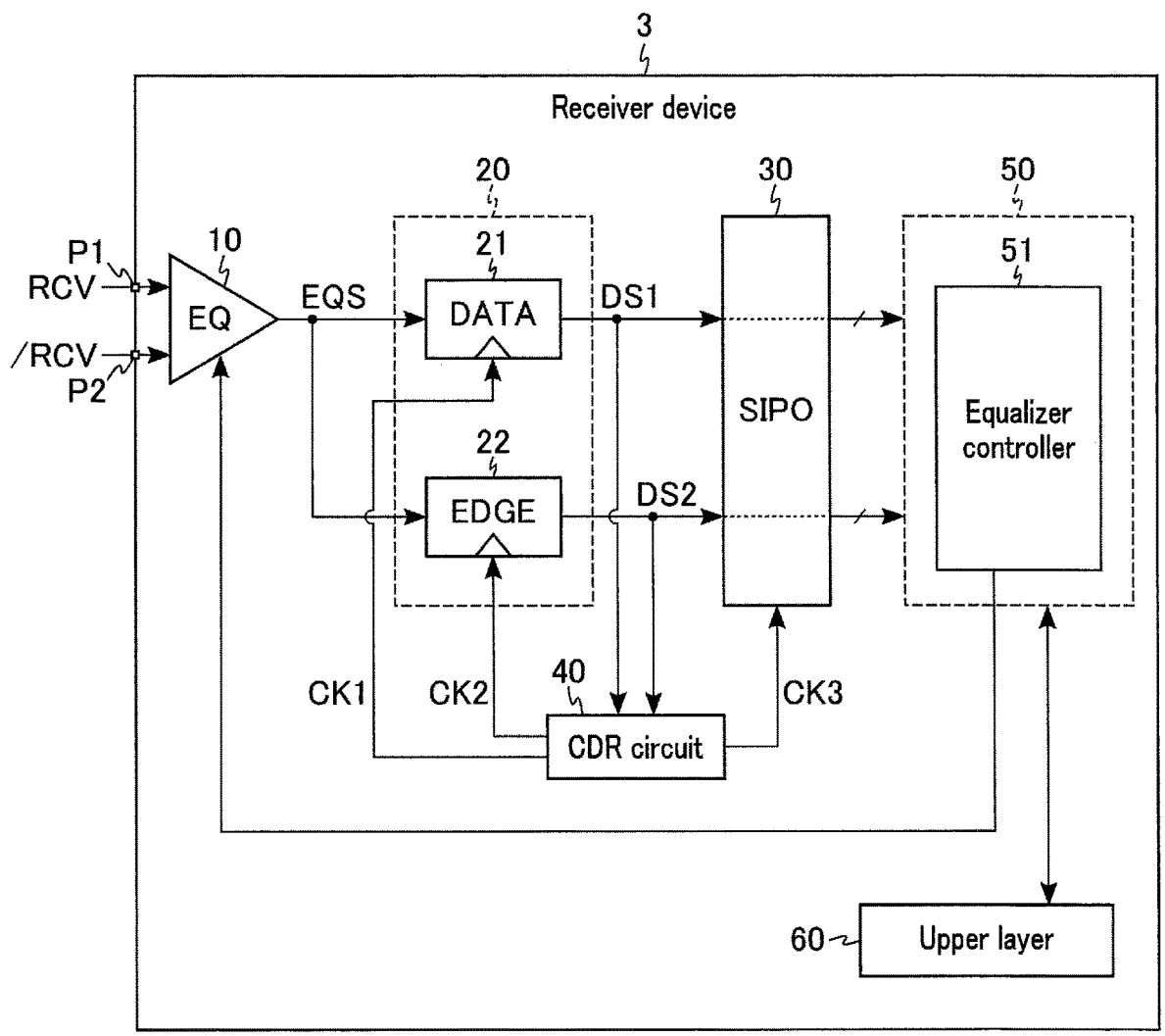
FIG. 3 is a block diagram illustrating an example of a configuration of the receiver device according to the first embodiment.

FIG. 3 is a block diagram illustrating an example of the configuration of the receiver device 3 according to the first embodiment. As illustrated in FIG. 3, the receiver device 3 includes, for example, an equalizer circuit 10, a data determination circuit 20, a serial-in parallel-out (SIPO) circuit 30, a clock data recovery (CDR) circuit 40, a digital signal processor 50, an upper layer 60, and pads P1 and P2.

The equalizer circuit 10 is an analog front end (AFE). The equalizer circuit 10 includes an amplifier circuit having frequency characteristics capable of compensating for the frequency characteristics of the transmission line 2. The equalizer circuit 10 receives inputs of the received signals RCV and /RCV via the pads P1 and P2, respectively. The equalizer circuit 10 generates an equalization signal EQS based on the received signals RCV and /RCV. The equalization signal EQS is the received signals RCV and /RCV in which the frequency characteristics of the transmission line 2 are compensated. The equalizer circuit 10 then outputs the generated equalization signal EQS to the data determination circuit 20. The detailed configuration of the equalizer circuit 10 is described later. Note that, although not illustrated, the equalization signal EQS is an equalization signal for a differential input, and thus the equalization signal EQS is actually a differential signal.

The data determination circuit 20 is a circuit that converts the equalization signal EQS outputted from the equalizer circuit 10 into a digital signal. The data determination circuit 20 includes, for example, a data sampler 21 ("DATA") and an edge sampler 22 ("EDGE"). The data sampler 21 converts the equalization signal EQS into a digital signal DS1 at a timing based on a clock signal CK1. The digital signal DS1 includes a plurality of consecutive digital values. The frequency of the clock signal CK1 corresponds to a sampling frequency of data. The edge sampler 22 converts the equalization signal EQS into a digital signal DS2 at a timing based on a clock signal CK2. The digital signal DS2 includes a plurality of consecutive digital values. The frequency of the clock signal CK2 is, for example, a clock signal having the same frequency as that of the clock signal CK1 and having a phase shifted, by a half cycle, from the clock signal CK1. The clock signal CK2 is used to determine a digital value of an edge (boundary) portion of each pulse contained in the equalization signal EQS. Each of the digital signals DS (DS1 and DS2) is outputted to the SIPO 30 and the CDR circuit 40.

The SIPO 30 is a circuit that outputs digital values inputted serially in parallel. The SIPO 30 buffers consecutive digital values outputted from the data determination circuit 20. The SIPO 30 then outputs the digital values thus buffered to an equalizer controller 51 in a predetermined parallel number. The SIPO 30 operates based on a clock signal CK3, for example, and handles each of the digital signal DS1 outputted from the data sampler 21 and the digital signal DS2 outputted from the edge sampler 22. The clock signal CK3 is, for example, the same as the clock signal CK1.

The CDR circuit 40 is a circuit capable of detecting phases of clock signals contained in the received signals RCV and /RCV and adjusting a phase of a clock signal used for data reception by the receiver device 3. The CDR circuit 40 receives the digital signals DS1 and DS2 outputted from the data determination circuit 20. The CDR circuit 40 calculates a correction amount of the phase of the clock signal based on the digital signals DS1 and DS2. The CDR circuit 40 then regenerates the clock signal CK1 used for data sampling based on the calculated correction amount of the phase. The CDR circuit 40 then outputs the clock signal CK1 thus regenerated to the data sampler 21 or the like. Further, the CDR circuit 40 generates the clock signals CK2 and CK3 based on the clock signal CK1 to output the clock signals CK2 and CK3 to the edge sampler 22 and the SIPO 30, respectively. The repetition of adjustment of the phase of the clock signal by the CDR circuit 40 is referred to as a "CDR loop". In a case where it is detected that the phases of the received signals RCV and /RCV received by the receiver device 3 are synchronized with the phase of the clock signal CK1, the CDR circuit 40 is locked. That is, the phase correction amount applied to the clock signal CK1 is fixed in a certain range. Note that the CDR circuit 40 may generate the clock signals CK2 and CK3 based on the digital signals DS1 and DS2. Further, depending on the configuration of the equalizer circuit 10, the CDR circuit 40 may generate a control signal for feedback control and input the control signal to the equalizer circuit 10.

The digital signal processor 50 is a circuit that handles a digital signal decoded by the data determination circuit 20. The digital signal processor 50 transfers the data (digital signal DS1) received from the SIPO 30 to the upper layer 60. Further, the digital signal processor 50 includes the equalizer controller 51. The equalizer controller 51 is a circuit that controls the adaptive processing of the receiver device 3. The equalizer controller 51 generates a control signal for feedback control on the equalizer circuit 10 based on the digital signals DS1 and DS2. The control signal generated by the equalizer circuit 10 is detailed later.

The upper layer 60 is a processing unit for handling data that the receiver device 3 has received from the transmitter device 1. The upper layer 60 includes, for example, a processor such as a central processing unit (CPU), a read only memory (ROM), and a random access memory (RAM). In the present example, the upper layer 60 is included in the receiver device 3; however, the configuration is not limited thereto. The upper layer 60 may be externally connected to the receiver device 3.

[1-1-3] Configuration of Equalizer Circuit 10

Figure 4:
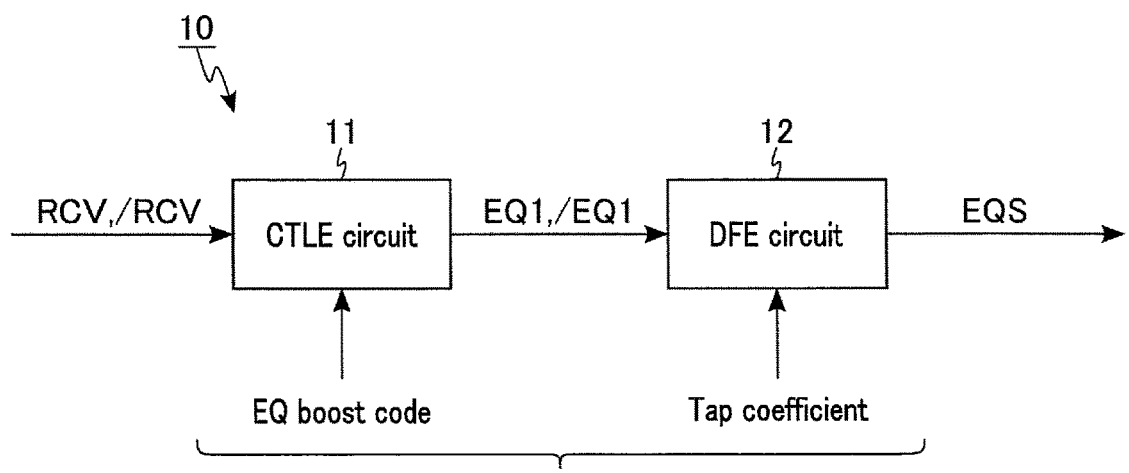
FIG. 4 is a block diagram illustrating an example of a configuration of an equalizer circuit of the receiver device according to the first embodiment.

FIG. 4 is a block diagram illustrating an example of the configuration of the equalizer circuit 10 of the receiver device 3 according to the first embodiment. As illustrated in FIG. 4, the equalizer circuit 10 includes, for example, a continuous time linear equalizer (CTLE) circuit 11 and a decision feedback equalizer (DFE) circuit 12.

The CTLE circuit 11 is an analog filter having a functional configuration as a linear equalizer. When receiving the received signals RCV and /RCV, the CTLE circuit 11 performs linear equalization processing for amplifying (boosting) a gain of a high frequency band of the received signals RCV and /RCV. Specifically, the CTLE circuit 11 boosts the high frequency bands of the received signals RCV and /RCV according to an EQ boost code to generate equalization signals EQ1 and /EQ1. The CTLE circuit 11 then transmits the generated equalization signals EQ1 and /EQ1 to the DFE circuit 12. The EQ boost code is a control signal generated by the equalizer controller 51, and is indicated by, for example, a numerical value within a certain range. The CTLE circuit 11 can adjust, based on the EQ boost code, a resistance value of a variable resistor, a capacitance value of a variable capacitance, and the like included in the CTLE circuit 11.

The DFE circuit 12 is a digital filter having a functional configuration as a nonlinear equalizer. The DFE circuit 12 performs nonlinear equalization processing for feeding back a determination signal to an input signal based on a tap coefficient. Specifically, for each of "n" digital values contained in the equalization signals EQ1 and /EQ1 for one cycle, the DFE circuit 12 executes arithmetic processing based on a digital value to be calculated and digital values of several preceding and subsequent symbols of the digital value to be calculated. Here, "n" is an any natural number. The DFE circuit 12 then generates the equalization signal EQS as a result of the arithmetic processing. The tap coefficient is a control signal generated by the equalizer controller 51. The tap coefficient is assigned to a digital value contained in a portion corresponding to the past by "k" unit intervals from the reference time in the input signal. Note that "k" is an integer of 1 or more and "n" or less.

Note that, in the receiver device 3 according to the first embodiment, the equalizer controller 51 has a functional configuration for determining an amount of boost to optimally equalize the equalization signals EQ1 and /EQ1 based on the received signals RCV and /RCV inputted to the CTLE circuit 11. Further, the equalizer controller 51 has a functional configuration for determining a tap coefficient to optimally equalize the equalization signal EQS based on the equalization signals EQ1 and /EQ1 inputted to the DFE circuit 12.

Note that the equalizer circuit 10 may have another circuit configuration. For example, the equalizer circuit 10 may include a variable gain amplifier (VGA), an analog to digital (AD) converter, and a feed forward equalizer (FFE). For example, the output of the CTLE circuit 11 may be amplified by the VGA, and the signal amplified by the VGA may be outputted to the AD converter.

(Configuration of CTLE Circuit 11)

Figure 5:
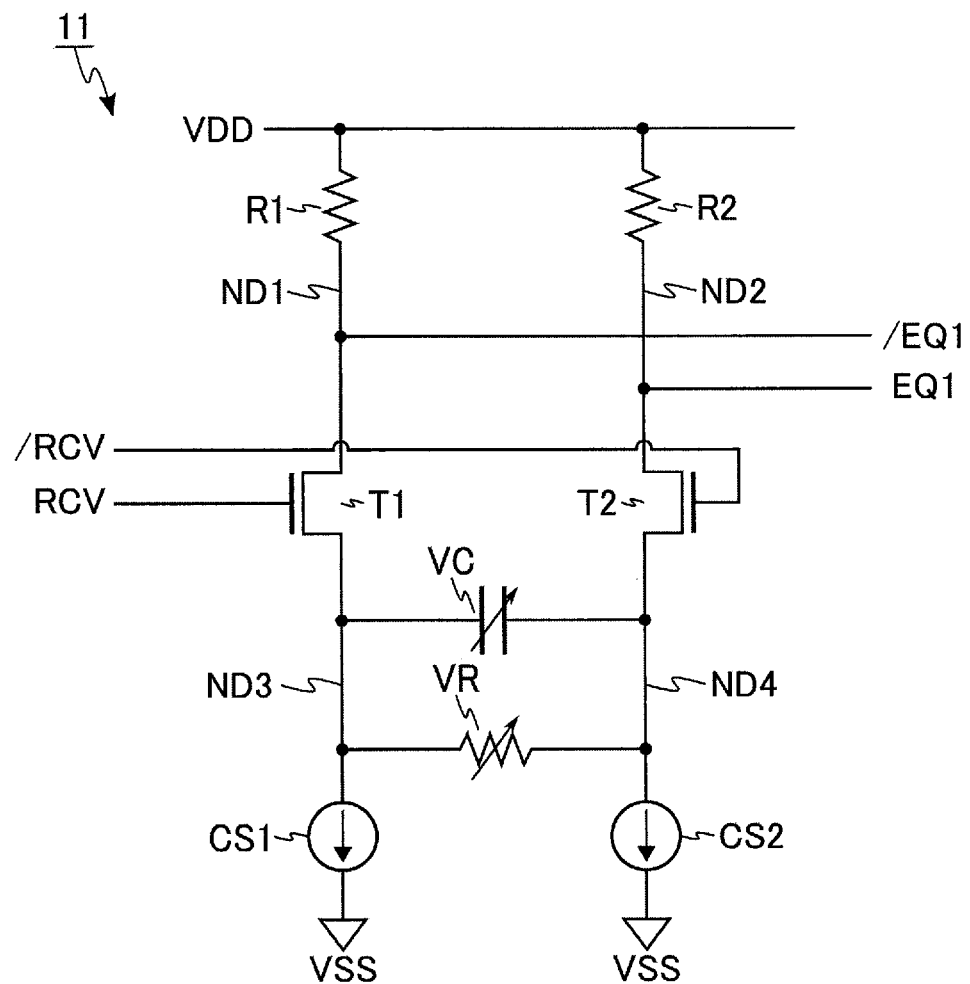
FIG. 5 is a circuit diagram illustrating an example of a circuit configuration of a CTLE circuit included in the equalizer circuit of the receiver device according to the first embodiment.

FIG. 5 is a circuit diagram illustrating an example of a circuit configuration of the CTLE circuit 11 included in the equalizer circuit 10 of the receiver device 3 according to the first embodiment. As illustrated in FIG. 5, the CTLE circuit 11 includes, for example, resistors R1 and R2, transistors T1 and T2, a variable capacitance element VC, a variable resistor VR, constant current sources CS1 and CS2, and nodes ND1 to ND4.

Each of the resistors R1 and R2 is a resistor used as a load of the CTLE circuit 11. The resistor R1 is connected between a power node VDD and the node ND1. The resistor R2 is connected between the power node VDD and the node ND2. The power node VDD is a power node, and a power supply voltage to the CTLE circuit 11 is applied to the power node VDD. Note that an inductor may be used as the load of the CTLE circuit 11.

Each of the transistors T1 and T2 is, for example, an N-type MOS transistor. The drain of the transistor T1 is connected to the node ND1. The source of the transistor T1 is connected to the node ND3. The gate of the transistor T1 receives an input of the received signal RCV. The drain of the transistor T2 is connected to the node ND2. The source of the transistor T2 is connected to the node ND4. The gate of the transistor T2 receives an input of the received signal /RCV. The CTLE circuit 11 outputs the equalization signals /EQ1 and EQ1 from the nodes ND1 and ND2, respectively.

The variable capacitance element VC is a capacitance element whose capacitance value is variable based on the EQ boost code. One electrode of the variable capacitance element VC is connected to the node ND3. The other electrode of the variable capacitance element VC is connected to the node ND4. The variable resistor VR is a resistor whose resistance value is variable based on the EQ boost code. One electrode of the variable resistor VR is connected to the node ND3. The other electrode of the variable resistor VR is connected to the node ND4.

Each of the constant current sources CS1 and CS2 is a power supply circuit that controls an output current to be constant. The constant current source CS1 is connected between the node ND3 and the power node VSS. The constant current source CS2 is connected between the node ND4 and the power node VSS. The power node VSS is a power node, and a ground voltage lower than the power supply voltage is applied to the power node VSS. The ground voltage is a reference potential of the CTLE circuit 11.

Note that the CTLE circuit 11 may have another circuit configuration. It suffices that the CTLE circuit 11 is configured to adaptively adjust the equalization characteristics according to the EQ boost code inputted from the equalizer controller 51.

Figure 6:
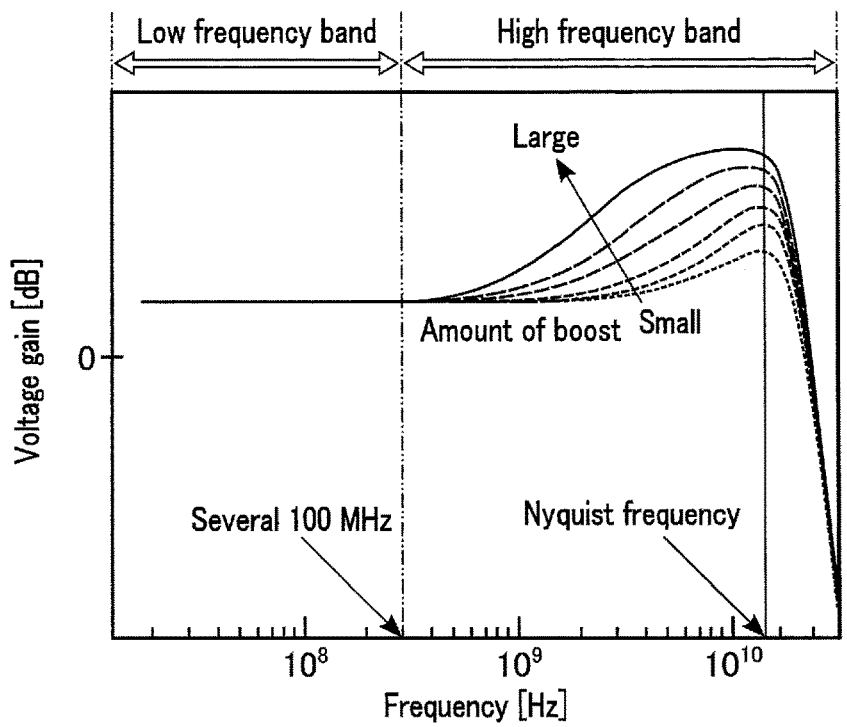
FIG. 6 is a diagram for explaining equalization characteristics of the CTLE circuit included in the equalizer circuit of the receiver device according to the first embodiment.

FIG. 6 is a diagram for explaining equalization characteristics of the CTLE circuit 11 included in the equalizer circuit 10 of the receiver device 3 according to the first embodiment. The vertical axis in FIG. 6 represents a voltage gain [dB] in the equalizer circuit 10. The horizontal axis in FIG. 6 represents a frequency. That is, FIG. 6 illustrates frequency characteristics of the CTLE circuit 11. In the present specification, the low frequency band is, for example, a band lower than several 100 MHz. The high frequency band is, for example, a band of a frequency on the order of GHz including a Nyquist frequency.

As illustrated in FIG. 6, the equalization characteristic of the CTLE circuit 11 is set such that a gain in the high frequency band is higher than a gain in the low frequency region. In the present example, the CTLE circuit 11 has equalization characteristics such that a gain near the Nyquist frequency is high in a case where the Nyquist frequency is 16 GHz. The amount of boost for the CTLE circuit 11 is defined as, for example, a difference between the gain in the low frequency band and the gain in the high frequency band in the equalization characteristics of the CTLE circuit 11. As the amount of boost for the CTLE circuit 11 increases, the difference from the gain increases.

Figure 7:
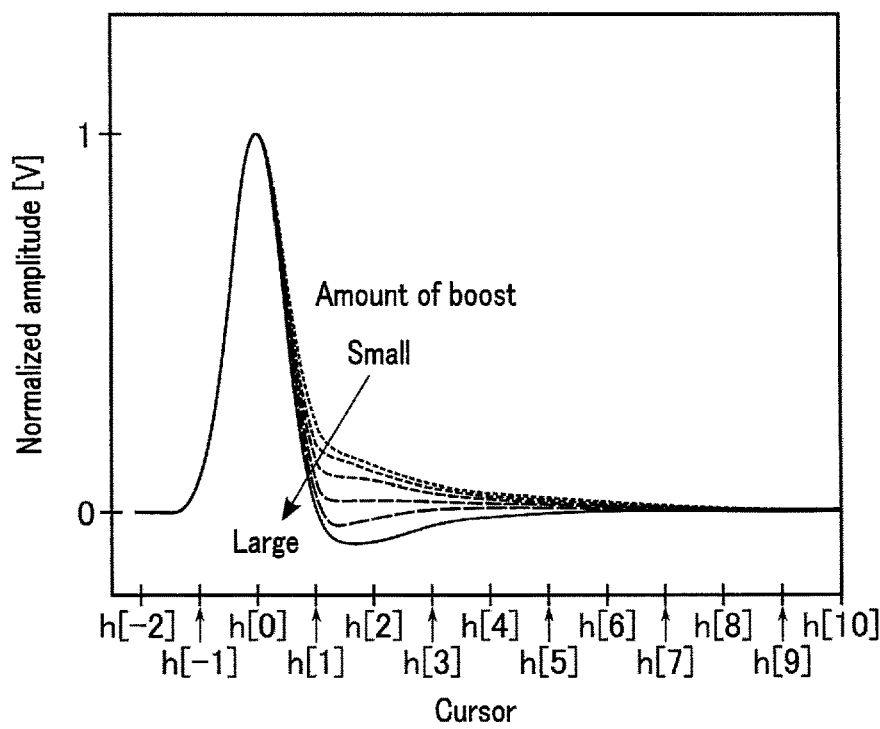
FIG. 7 is a waveform diagram illustrating an example of a compensation result by the CTLE circuit included in the equalizer circuit of the receiver device according to the first embodiment.

FIG. 7 is a waveform diagram illustrating an example of a compensation result by the CTLE circuit 11 included in the equalizer circuit 10 of the receiver device 3 according to the first embodiment. The vertical axis in FIG. 7 represents an amplitude (voltage) [V] normalized based on a voltage value of the main cursor h[0]. The horizontal axis in FIG. 7 represents a cursor. As illustrated in FIG. 7, the voltage value of each of the post cursors h[1], h[2], ..., and so on with respect to the normalized voltage value of the main cursor h[0] can decrease as the amount of boost increases. However, if the amount of boost for the CTLE circuit 11 is excessively large, the signal may be overcompensated.

The compensation for the received signals RCV and /RCV by the CTLE circuit 11 preferably makes the amplitude (voltage) at the post cursors 0 (zero). The voltage after the post cursor h[1] is also called residual inter-symbol interference (residual ISI). The influence of the residual ISI is dominant in the vicinity of the main cursor h[0]. Therefore, the equalizer controller 51 adjusts the EQ boost code (amount of boost) so that, in the adaptive processing, the ISI in the vicinity of the main cursor h[0] converges to the minimum (near 0 (zero) as far as possible).

Note that the CTLE circuit 11 directly amplifies the high frequency band of the received signal RCV. Therefore, the CTLE circuit 11 can simultaneously amplify noise components contained in the amplified high frequency band. Therefore, in order to reduce the influence of the noise contained in the equalization signals EQ1 and /EQ1, it is preferable that the amount of boost set in the CTLE circuit 11 is small.

(Configuration of DFE Circuit 12)

Figures 8, 9:
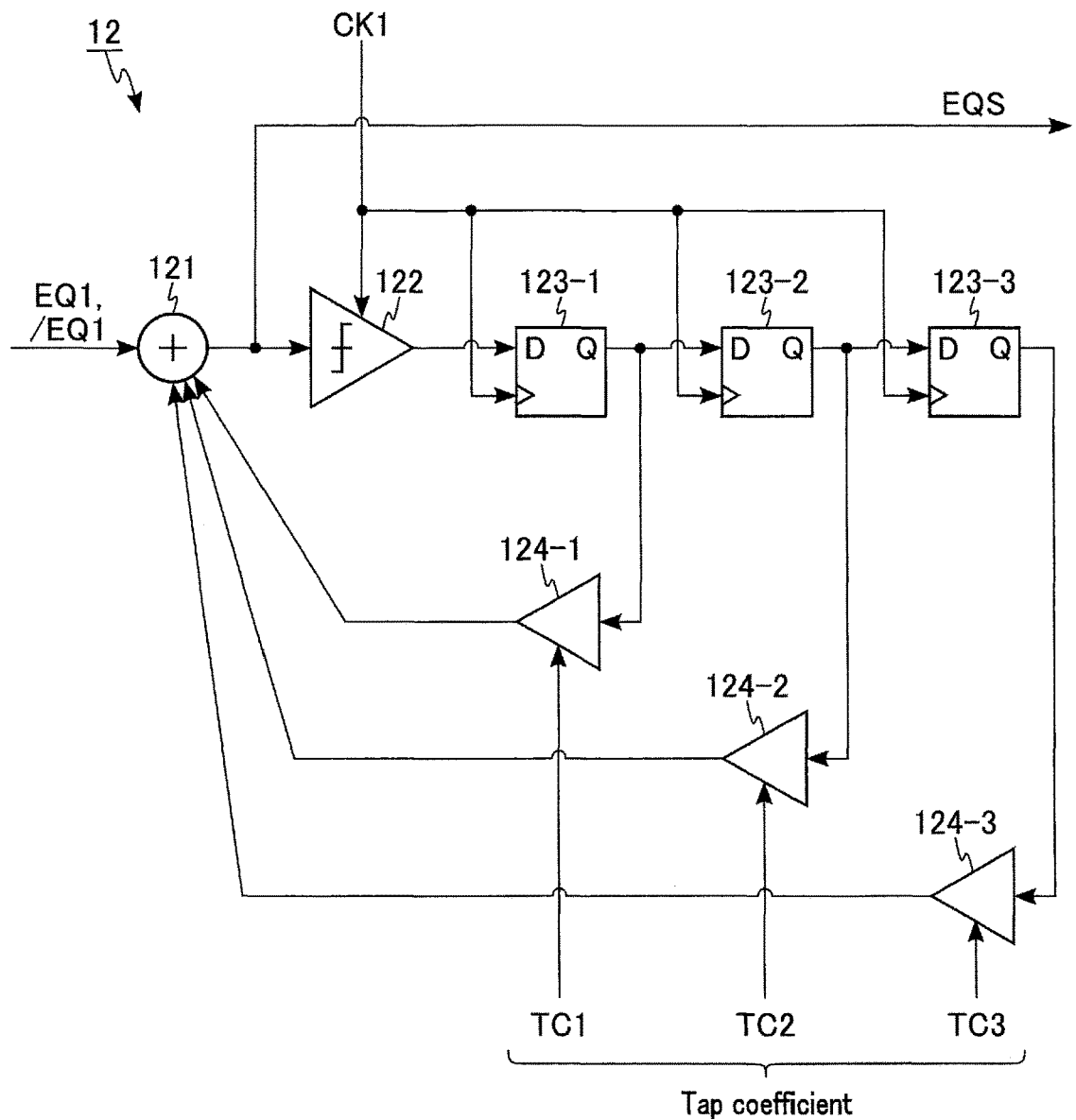
FIG. 8 is a circuit diagram illustrating an example of a circuit configuration of a DFE circuit included in the equalizer circuit of the receiver device according to the first embodiment.
FIG. 9 is a table illustrating an example of a pattern filter used in adaptive processing of the receiver device according to the first embodiment.

FIG. 8 is a circuit diagram illustrating an example of a circuit configuration of the DFE circuit 12 included in the equalizer circuit 10 of the receiver device 3 according to the first embodiment. As illustrated in FIG. 8, the DFE circuit 12 includes, for example, an adder 121, a determination circuit 122, flip-flop circuits 123 (123-1, 123-2, and 123-3), and buffer circuits 124 (124-1, 124-2, and 124-3).

The adder 121 adds a feedback signal from each of the plurality of buffer circuits 124 to the equalization signals EQ1 and /EQ1. The adder 121 then outputs a signal obtained by the addition to the determination circuit 122.

In response to the signal received from the adder 121, the determination circuit 122 determines whether data contained in the received signal is "0" or "1", and generates a determination signal according to the determination result. The determination circuit 122 determines data in a plurality of unit intervals from the present to the past. That is, the determination signal is a pulse signal having an amplitude level corresponding to a digital value determined in each unit interval. Note that the unit interval in which the signal is determined is determined based on the clock signal CK1 separately inputted to the determination circuit 122. The determination circuit 122 outputs the generated determination signal to an input ("D") of the flip-flop circuit 123-1.

Each flip-flop circuit 123 inputs and outputs a digital value based on the clock signal CK1. An output ("Q") of the flip-flop circuit 123-1 is connected to an input of the flip-flop circuit 123-2. An output of the flip-flop circuit 123-2 is connected to an input of the flip-flop circuit 123-3. As a result, the flip-flop circuits 123-1, 123-2, and 123-3 hold digital values shifted by one unit interval in the determination signal. Specifically, the flip-flop circuits 123-1, 123-2, and 123-3 hold digital values of the past time, from the reference time, corresponding to one unit interval, two unit intervals, and three unit intervals, respectively. Further, the flip-flop circuits 123-1, 123-2, and 123-3 are associated with the buffer circuits 124-1, 124-2, and 124-3, respectively. The flip-flop circuit 123-1 outputs the held digital value also to the buffer circuit 124-1. The flip-flop circuit 123-2 outputs the held digital value also to the buffer circuit 124-2. The flip-flop circuit 123-3 outputs the held digital value also to the buffer circuit 124-3.

The buffer circuits 124-1, 124-2, and 124-3 receive tap coefficients TC1, TC2, and TC3, respectively. The tap coefficients TC1 to TC3 are control signals generated by the equalizer controller 51. The buffer circuit 124-1 generates, as the feedback signal, a signal obtained by inverting a result obtained by multiplying the digital value held by the flip-flop circuit 123-1 by the tap coefficient TC1, and outputs the resulting signal to the adder 121. The buffer circuit 124-2 generates, as the feedback signal, a signal obtained by inverting a result obtained by multiplying the digital value held by the flip-flop circuit 123-2 by the tap coefficient TC2, and outputs the resulting signal to the adder 121. The buffer circuit 124-3 generates, as the feedback signal, a signal obtained by inverting a result obtained by multiplying the digital value held by the flip-flop circuit 123-3 by the tap coefficient TC3, and outputs the resulting signal to the adder 121.

As a result, the DFE circuit 12 can combine the feedback signals of the buffer circuits 124-1, 124-2, and 124-3 with the equalization signals EQ1 and /EQ1. The DFE circuit 12 outputs the equalization signals EQ1 and /EQ1 combined with the feedback signals as the equalization signal EQS. The inter-symbol interference in the equalization signal EQS can be reduced by combining the feedback signals. The data determination circuit 20 illustrated in FIG. 3 can generate the digital signal DS in which the inter-symbol interference is compensated by performing determination operation on the equalization signal EQS.

Note that the number of taps (sets of the flip-flop circuit 123 and the buffer circuit 124) included in the DFE circuit 12 is not limited to three, and may be other numbers. It suffices that the DFE circuit 12 is configured to adaptively adjust the equalization characteristics according to the plurality of tap coefficients instructed by the equalizer controller 51.

[1-2] Reception Method

Hereinafter, the adaptive processing of the equalizer controller 51 is described as a data reception method by the receiver device 3 according to the first embodiment.

[1-2-1] Outline of Adaptive Processing

The adaptive processing is processing of performing feedback control so as to minimize the residual ISI with a focus on a specific bit sequence contained in communication data transmitted by the transmitter device 1. The communication data used in the adaptive processing is, for example, a random pattern, and varies by standard. The equalizer controller 51 uses a pattern filter to adjust an EQ parameter in the adaptive processing. The EQ parameter is a parameter adjusted by the equalizer controller 51 in the adaptive processing. The EQ parameter includes an EQ boost code and a tap coefficient. The pattern filter is a filter that extracts a matched data pattern. The pattern filter corresponds to, for example, a combination of cursors used to calculate the residual ISI in the adaptive processing. The equalizer controller 51 adjusts the EQ parameter based on the calculation result of the ISI of a part that matches the pattern filter in data patterns of the digital signal DS1 inputted from the SIPO 30. The CTLE circuit 11 can be set (adjusted) to optimum equalization characteristics by the adaptive processing, by the equalizer controller 51, based on the characteristics of the received signals RCV and /RCV (that is, transmission characteristics of the transmission line 2).

FIG. 9 is a table illustrating an example of a pattern filter used in the adaptive processing of the receiver device 3 according to the first embodiment. The settings of the pattern filter can be, for example, pattern filters PF1 to PF4 as illustrated in FIG. 9. FIG. 9 indicates that a data value sampled at a timing of h[0] which is a main cursor is "1", and a data value before or after n (n ranges from 1 to 4) UI as viewed from the main cursor is "0".

The combination of post cursors of interest in the pattern filter PF1 is "h[1]+h[2]". In this case, the equalizer controller 51 extracts a sequence in which a data value corresponding to h[−1] to h[4] is "0100** ("*" is a wildcard)" from the data patterns of the digital signal DS1, and uses the same to detect the residual ISI regarding the post cursors h[1] and h[2]. Herein, a state in which a data value corresponding to h[−1] to h[4] is "0100" corresponds to a state in which a data pattern of the digital signal DS1 is "0010".

The combination of post cursors of interest in the pattern filter PF2 is "h[2]+h[3]". In this case, the equalizer controller 51 extracts a sequence in which a data value corresponding to h[−1] to h[4] is "01*00*" from the data patterns of the digital signal DS1, and uses the same to detect the residual ISI regarding the post cursors h[2] and h[3]. Herein, a state in which a data value corresponding to h[−1] to h[4] is "01*00*" corresponds to a state in which a data pattern of the digital signal DS1 is "*00*10".

The combination of post cursors of interest in the pattern filter PF3 is "h[1]+h[2]+h[3]". In this case, the equalizer controller 51 extracts a sequence in which a data value corresponding to h[−1] to h[4] is "01000*" from the data patterns of the digital signal DS1, and uses the same to detect the residual ISI regarding the post cursors h[1], h[2], and h[3]. Herein, a state in which a data value corresponding to h[−1] to h[4] is "01000*" corresponds to a state in which a data pattern of the digital signal DS1 is "*00010".

The combination of post cursors of interest in the pattern filter PF4 is "h[2]+h[3]+h[4]". In this case, the equalizer controller 51 extracts a sequence in which a data value corresponding to h[−1] to h[4] is "01*000" from the data patterns of the digital signal DS1, and uses the same to detect the residual ISI regarding the post cursors h[2], h[3], and h[4]. Herein, a state in which a data value corresponding to h[−1] to h[4] is "01*000" corresponds to a state in which a data pattern of the digital signal DS1 is "000*10".

Note that the settings of the pattern filters used in the adaptive processing of the receiver device 3 according to the first embodiment may be other settings. For example, an inverted pattern may be used as the pattern filter. Specifically, the equalizer controller 51 may use a pattern filter in which "0" and "1" of each cursor are exchanged in each pattern filter illustrated in FIG. 9. The equalizer controller 51 may use both the set pattern filter and the inverted pattern of the set pattern filter for the adaptive processing. In the receiver device 3 according to the first embodiment, it suffices that the equalizer controller 51 can use a plurality of types of pattern filters in the adaptive processing.

[1-2-2] Flow of Adaptive Processing

Figure 10:
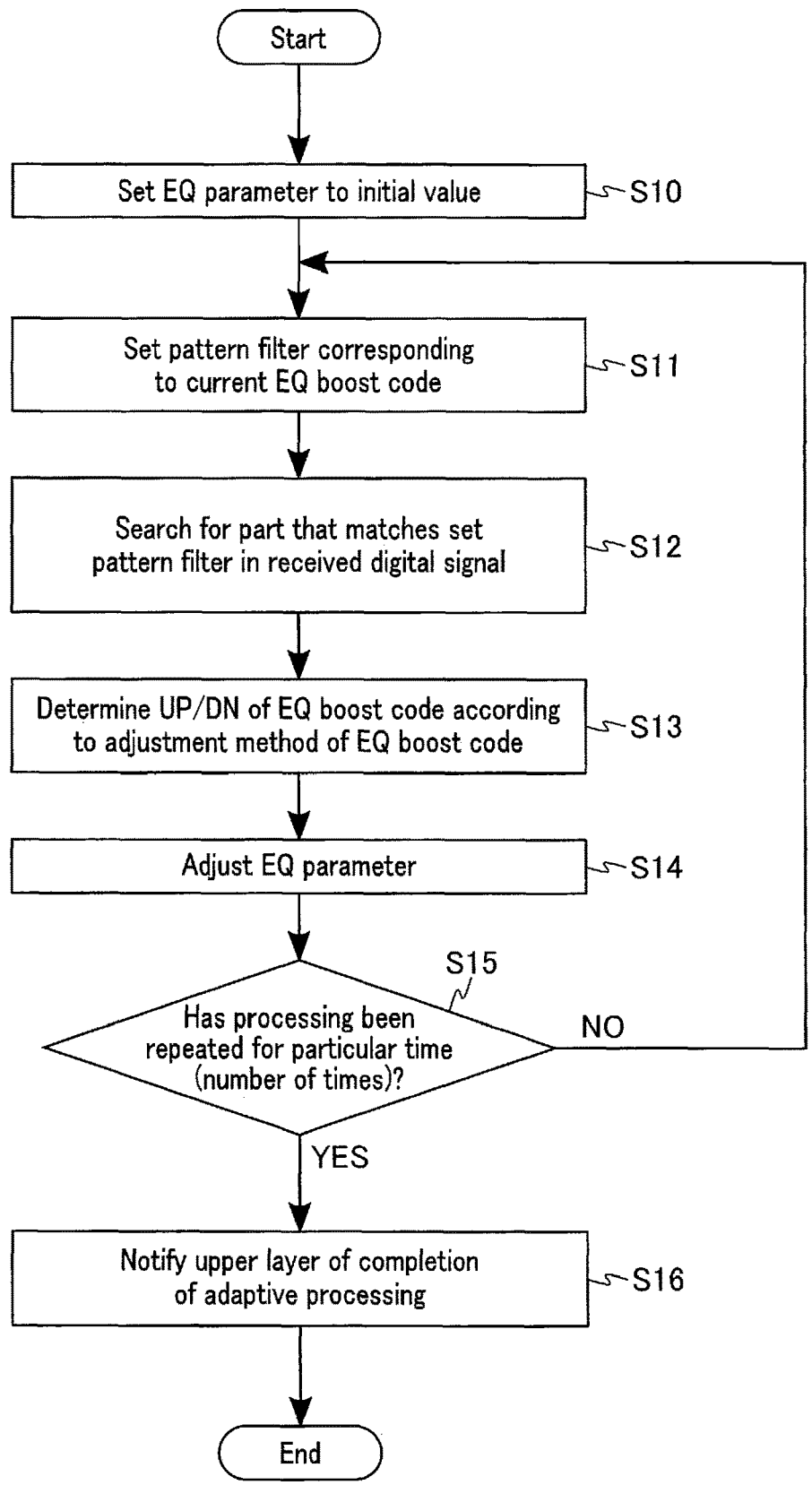
FIG. 10 is a flowchart depicting an example of a flow of adaptive processing of the receiver device according to the first embodiment.

FIG. 10 is a flowchart depicting an example of a flow of the adaptive processing of the receiver device 3 according to the first embodiment. The flow of the adaptive processing is described below with reference to FIG. 10.

When receiving a signal notifying that the adaptive processing state is entered from the upper layer 60, the equalizer controller 51 starts the adaptive processing (START).

First, the equalizer controller 51 sets the EQ parameter to an initial value (S10). Among the initial values of the EQ parameter, the initial value of the EQ boost code may be started from one having a smaller amount of boost, may be started from one having a larger amount of boost, or may be started from one having an intermediate value.

Next, the equalizer controller 51 sets a pattern filter corresponding to the current EQ boost code (S11). In other words, in the processing of S11, the equalizer controller 51 selects a pattern filter associated with the current EQ boost code.

Next, the equalizer controller 51 searches for a part that matches the set pattern filter in the received digital signal DS1 (S12).

When detecting the part that matches the set pattern filter in S12, the equalizer controller 51 determines UP/DOWN of the EQ boost code according to a method for adjusting the EQ boost code (S13). In the processing of S13, for example, the residual ISI is detected based on the set pattern filter. The method for adjusting the EQ boost code is detailed in the second embodiment and the third embodiment.

The equalizer controller 51 adjusts the EQ parameter based on the processing of S13 (S14). In adjusting the EQ parameter, the equalizer controller 51, for example, adds (UP) or subtracts (DOWN) the EQ boost code. When the processing of S14 is completed, the processing of the equalizer controller 51 proceeds to the processing of S15.

In the processing of S15, the equalizer controller 51 checks whether or not the processing of S11 to S14 is repeated for a particular time or a particular number of times.

In the processing of S15, in a case where the equalizer controller 51 confirms that the processing of S11 to S14 is not repeated for the particular time or the particular number of times (S15: NO), the processing proceeds to the processing of S11.

In the processing of S15, in a case where the equalizer controller 51 confirms that the processing of S11 to S14 is repeated for the particular time or the particular number of times (S15: YES), the processing proceeds to the processing of S16.

In the processing of S16, the equalizer controller 51 notifies the upper layer 60 of the completion of the adaptive processing. To be specific, the equalizer controller 51 issues a signal notifying that the adaptive processing is completed, and transmits the issued signal to the upper layer 60. When the processing of S16 is completed, the equalizer controller 51 ends the series of processing of FIG. 10 (END).

As described above, in the receiver device 3 according to the first embodiment, the equalizer controller 51 adjusts, in the adaptive processing, the amount of boost for the CTLE circuit 11 based on the inter-symbol interference of a part that matches a data pattern of the set pattern filter in the digital signal DS1, and dynamically changes a pattern filter to be set according to the amount of boost amount for the CTLE circuit 111. Note that the completion of the adaptive processing may be determined based on whether or not the residual ISI in the set pattern filter has converged. In such a case, for example, the processing of S15 is replaced with a determination as to whether or not the residual ISI has converged, and, in a case where the residual ISI has not converged, the processing proceeds to the processing of S11, and, in a case where the residual IST has converged, the processing proceeds to the processing of S16.

[1-2-3] Specific Example of Adaptive Processing

FIGS. 11 and 12 are graphs illustrating examples of a relationship between the residual ISI and the EQ boost code for each of the pattern filters PF1 to PF4 in a low-loss environment and in a high-loss environment, respectively. The "low-loss" indicates that a signal loss is small. The "high-loss" indicates that a signal loss is large. For example, in a case where the same transmission medium is used, the length of the low-loss transmission line 2 is shorter than that of the high-loss transmission line 2. The vertical axis in each of FIGS. 11 and 12 represents a value corresponding to an amount of the residual ISI. The horizontal axis in each of FIGS. 11 and 12 represents a value of the EQ boost code. Note that the EQ boost code is, for example, a consecutive numerical value and is given in a range of 0 to 64. The CTLE circuit 11 can change the amount of boost according to the numerical value of the EQ boost code. For example, the amount of boost is set to be larger as the numerical value of the EQ boost code is larger.

In a case where the transmission line 2 has a low loss, as illustrated in FIG. 11, the residual ISI can converge to 0 (convergence point) in any of the pattern filters PF1 to PF4. In addition, the residual ISI of the pattern filters PF2 and PF4 not including the post cursor h[1] converges with an amount of boost larger than that of the pattern filters PF1 and PF3 including the post cursor h[1]. In the case where the transmission line 2 has a low loss, the residual ISI has a relatively small value. Therefore, if the pattern filter including the post cursor h[1] in the vicinity of the main cursor is used, it is more likely to converge to a more appropriate equalized state. Therefore, in the case where the transmission line 2 has a low loss, the pattern filter preferably includes the post cursor h[1].

In a case where the transmission line 2 has a high loss, as illustrated in FIG. 12, the residual ISI of the pattern filters PF2 and PF4 converges to the convergence point. On the other hand, the residual ISI of the pattern filters PF1 and PF3 does not converge to the convergence point. A difference between the set of the pattern filters PF2 and PF4 and the set of the pattern filters PF1 and PF3 is whether or not the post cursor h[1] is included therein. In the case where the transmission line 2 has a high loss, the residual ISI of the post cursor h[1] is at a very high voltage level. In a case where the post cursor h[1] is used to detect the residual ISI, in order to correct such a very large residual ISI in the CTLE circuit 11, it is necessary to increase the amount of boost at the Nyquist frequency. As a result, the post cursor h[2] and subsequent portions undershoot, and overcompensation occurs. Therefore, in the case where the transmission line 2 has a high loss, the pattern filter preferably does not include the post cursor h[1].

FIG. 13 is a schematic diagram illustrating an example of a method for switching between pattern filters in the receiver device 3 according to the first embodiment. FIG. 13 illustrates an example of association between numerical values of the EQ boost code and the pattern filters PF. This example illustrates a case where two types of pattern filters PF3 (h[1]+h[2]+h[3]) and PF4 (h[2]+h[3]+h[4]) are used in the adaptive processing. As illustrated in FIG. 13, in the present example, the equalizer controller 51 selects the pattern filter PF3, for example, in a case where the EQ boost code in which the amount of boost is in a relatively small range is a numerical value included in the range of "0" to "31". On the other hand, the equalizer controller 51 selects the pattern filter PF4 in a case where the EQ boost code in which the amount of boost is in a relatively large range is a numerical value included in the range of "32" to "64". As described above, in the receiver device 3 according to the first embodiment, the equalizer controller 51 can switch between the pattern filters according to the numerical value of the EQ boost code.

Note that the association between the EQ boost code and the pattern filter is appropriately set in advance. Three or more types of pattern filters may be prepared in association with ranges of EQ boost codes different from each other. The number of cursors set in the pattern filters used in the adaptive processing may be the same or different. In addition, as the number of cursors used in each pattern filter increases, the number of parts that match the pattern filter in the data pattern used in the adaptive processing decreases, and the update frequency of the EQ parameter decreases. Therefore, the number of cursors used as the pattern filter is preferably set to be small within a range in which the compensation quality of the signal by the adaptive processing can be maintained.

[1-3] Effects of First Embodiment

According to the receiver device 3 of the first embodiment described above, it is possible to shorten the processing time of the adaptive processing with signal compensation accuracy maintained. Hereinafter, effects of the first embodiment are detailed.

In the transmission of signals between the transmitter device and the receiver device, a signal loss in a band increases with an increase in speed of serial communication of various standards. In order to correct the signal loss, the equalizer circuit is implemented in the receiver device. The communication quality can improve by appropriately adjusting the settings of the equalizer circuit according to the signal loss (adaptive processing). Since the amount of signal loss varies by specifications of the transmission line, it is preferable that the receiver device can cope with various signal losses. In addition, the equalizer circuit sometimes uses a pattern filter in order to extract a bit pattern suitable for adaptive control of the equalizer circuit from data patterns during the adaptive processing.

However, optimum settings of the pattern filter vary depending on signal quality (channel conditions). For example, in a case where the adaptive processing is executed by a predetermined pattern filter, a pattern filter that prioritizes adaptation to a high-loss transmission line may be used. In a case where a pattern filter optimized for a high-loss transmission line is used for adaptive processing for a low-loss transmission line, it is possible to receive a signal, but there is a possibility that an optimal compensation amount is not set. Another method is also possible in which a plurality of pattern filters is used to perform the adaptive processing a plurality of times, the opening state of an eye pattern of the received signal is examined by an eye monitor to determine the compensation amount of a signal. In such a case, an optimal compensation amount may be applied for each quality of the signal; however, the cost of the receiver device increases due to implementation of the eye monitor function. Further, since the processing time of the adaptive processing executed before the start of communication increases, it may take a long time to start the communication.

Further, it is possible that the receiver device executes two-step equalization processing when receiving a signal. The two-step equalization processing includes pre-equalization processing and fine equalization processing. The pre-equalization processing is rough adaptive processing for the CTLE circuit, and is executed to estimate the characteristics of the transmission line. The fine equalization processing is adaptive processing for the CTLE circuit and the DFE circuit, and is executed based on the amount of boost for the CTLE circuit determined in the pre-equalization processing. Execution of the pre-equalization processing can improve the adaptation accuracy in the fine equalization processing; however, the time required for the entire adaptive processing is longer.

Therefore, the receiver device 3 according to the first embodiment defines a pattern filter correlated with the amount of boost for the CTLE circuit 11 in advance. That is, in the adaptive processing of the receiver device 3, the pattern filter is dynamically changed according to the EQ boost code. This enables the receiver device 3 according to the first embodiment to converge an amount for adjusting the amount of boost for the CTLE circuit 11 by, for example, processing corresponding to the pre-equalization processing.

Specifically, in a case where the EQ boost code is adjusted to be small with the progress of the adaptive processing, that is, in a case where the transmission line 2 has a low loss, the equalizer controller 51 selects, for example, a pattern filter using the post cursor h[1] to detect the residual ISI. On the other hand, in a case where the EQ boost code is adjusted to be large with the progress of the adaptive processing, that is, in a case where the transmission line 2 has a high loss, the equalizer controller 51 selects, for example, a pattern filter that does not use the post cursor h[1] to detect the residual ISI.

As a result, the receiver device 3 according to the first embodiment can appropriately select a pattern filter according to the characteristics of the signal loss as the adaptive processing progresses. This enables the receiver device 3 according to the first embodiment to reduce the residual ISI as much as possible and to set an optimum EQ boost code in the CTLE circuit 11. Further, since the receiver device 3 can determine the amount of boost for the CTLE circuit 11 by the processing corresponding to the pre-equalization processing, the time for the adaptive processing can be shortened. Therefore, the receiver device 3 of the first embodiment can shorten the processing time of the adaptive processing with signal compensation accuracy maintained.

Note that, in the receiver device 3 according to the first embodiment, the upper layer 60 can shift to processing of the next state in response to notification of completion of the adaptive processing. For example, in response to detection of completion of the adaptive processing, the upper layer 60 notifies the transmitter device 1 of the completion of the adaptive processing. This enables the transmitter device 1 to start the next processing of the adaptive processing without waiting for the time allocated to the adaptive processing to elapse. In addition, the upper layer 60 may request the transmitter device 1 to perform communication at a lower data rate in a case where the adaptive processing ends abnormally. As described above, in the receiver device 3 according to the first embodiment, the upper layer 60 can determine which state of processing is to be executed next by transmitting a response toward the transmitter device 1 according to the result of the adaptive processing.

[2] Second Embodiment

A receiver device 3A according to the second embodiment has a configuration similar to that of the first embodiment. The receiver device 3A according to the second embodiment adjusts an EQ boost code using edge information of a signal that has passed through an equalizer circuit 10 in the adaptive processing described in the first embodiment. The following is a description of a difference between the receiver device 3A according to the second embodiment and that of the first embodiment.

[2-1] Reception Method

Figures 14, 15:
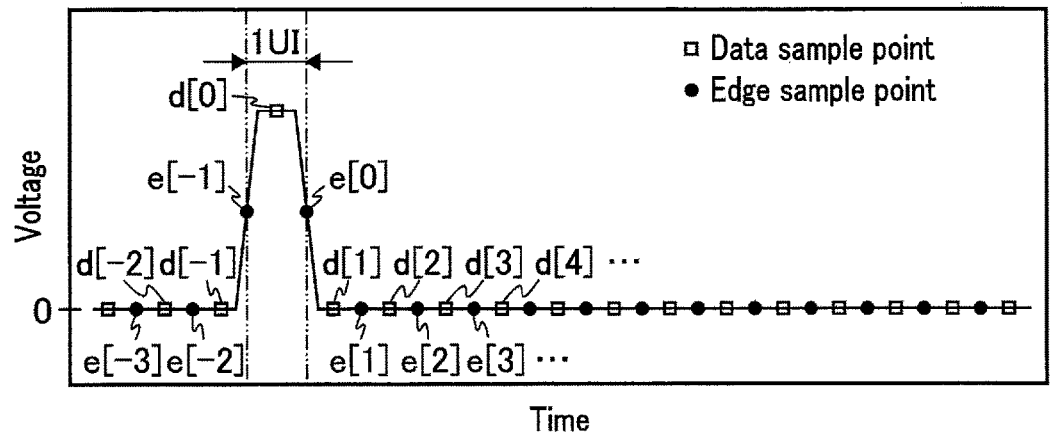
FIG. 14 is a waveform diagram illustrating an example of sample points in a receiver device according to a second embodiment.
FIG. 15 is a truth table illustrating an example of a method for adjusting an EQ boost code in adaptive processing of the receiver device according to the second embodiment.

FIG. 14 is a waveform diagram illustrating an example of sample points in the receiver device 3A according to the second embodiment. The vertical axis of the waveform diagram illustrated in FIG. 14 represents a signal voltage (amplitude). The horizontal axis of the waveform diagram illustrated in FIG. 14 represents a time. Square plots added in FIG. 14 correspond to sample points (data sample points) corresponding to a clock signal CK1. Dot plots added in FIG. 14 correspond to sample points (edge sample points) corresponding to a clock signal CK2. Since the clock signal CK2 is a signal shifted by a half cycle from the clock signal CK1, the edge sample points are arranged between the adjacent data sample points as illustrated in FIG. 14. Specifically, an edge sample point e[−1] is arranged between a data sample point d[0] and a data sample point d[−1]. An edge sample point e[0] is arranged between the data sample point d[0] and an edge sample point e[0].

Then, in the receiver device 3A according to the second embodiment, an equalizer controller 51A adjusts, in the adaptive processing, an amount of boost for a CTLE circuit 11 based on sampling results of two edge sample points sandwiching the data sample point that matches a reference point of a pattern filter set for a digital signal DS1 among the sample points of a digital signal DS2.

FIG. 15 is a truth table illustrating an example of a method for adjusting the EQ boost code in the adaptive processing of the receiver device 3A according to the second embodiment. As illustrated in FIG. 15, in the receiver device 3A according to the second embodiment, the equalizer controller 51A adjusts the EQ boost code based on a predetermined data pattern and edge information.

Specifically, each of the edge sample points e[−1] and e[1] is "0" data, which shows that the amplitude of an output signal of the CTLE circuit 11 is small. Therefore, for example, when detecting a pattern in which a digital value of each of the data sample points d[−1] to d[4] is "010000" and each of the edge sample points e[−1] and e[1] is "0" data (voltage at "L" level) in data patterns received during the adaptive processing, the equalizer controller 51A increments the EQ boost code (for example, +1).

On the other hand, each of the edge sample points e[−1] and e[1] is "1" data, which shows that the amplitude of an output signal of the CTLE circuit 11 is large. Therefore, for example, when detecting a pattern in which a digital value of each of the data sample points d[−1] to d[4] is "010000" and each of the edge sample points e[−1] and e[1] is "1" data (voltage at "H" level) in the data patterns received during the adaptive processing, the equalizer controller 51A decrements the EQ boost code (for example, −1).

Further, in a case where the data pattern is in another state at each of the data sample points and the edge sample points, the equalizer controller 51A does not change the EQ boost code. As described above, the equalizer controller 51A determines whether the amount of boost by the CTLE circuit 11 is insufficient, excessive, or appropriate based on each of information on the data sample points and information on the edge sample points, and feeds back to the EQ parameter (EQ boost code).

[2-2] Effects of Second Embodiment

As described above, the receiver device 3A according to the second embodiment can adjust the EQ boost code using the edge information of a signal that has passed through the equalizer circuit 10. Then, the receiver device 3A according to the second embodiment executes the adaptive processing as in the first embodiment, so that an effect similar to that of the first embodiment can be obtained.

[3] Third Embodiment

A receiver device 3B according to the third embodiment adjusts an EQ boost code using amplitude information of an output signal of the equalizer circuit 10 in the adaptive processing described in the first embodiment. The following is a description of a difference between the receiver device 3B according to the third embodiment and that of the first embodiment.

[3-1] Configuration

Figures 16, 17:
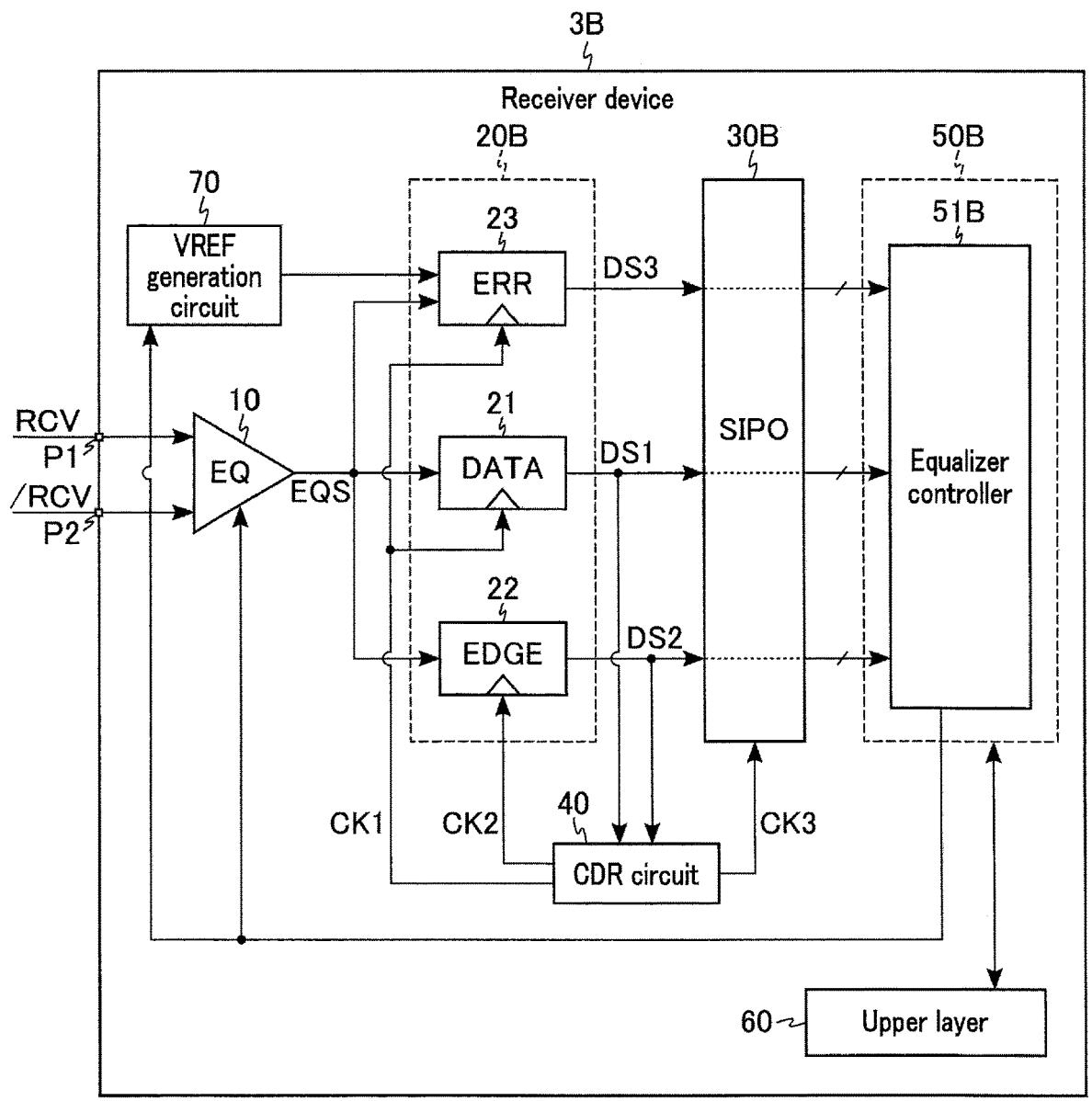
FIG. 16 is a block diagram illustrating an example of a configuration of a receiver device according to a third embodiment.
FIG. 17 is a truth table illustrating an example of a method for adjusting an EQ boost code in adaptive processing of the receiver device according to the third embodiment.

FIG. 16 is a block diagram illustrating an example of the configuration of the receiver device 3B according to the third embodiment. As illustrated in FIG. 16, the receiver device 3B has a configuration in which a VREF generation circuit 70 and an error sampler 23 ("ERR") are added to the receiver device 3 according to the first embodiment.

The VREF generation circuit 70 is a voltage generator that generates a reference voltage VREF. The reference voltage VREF is a voltage used as a reference for adjusting the amplitude of an equalization signal EQS. The VREF generation circuit 70 inputs the generated reference voltage VREF to the error sampler 23. Further, the VREF generation circuit 70 can adjust a level of the reference voltage VREF based on control of an equalizer controller 51B included in a digital signal processor 50B. In the present example, a VREF code is used to control the reference voltage VREF. The VREF code is, for example, a consecutive numerical value. The numerical value of the VREF code is associated with the level of the reference voltage VREF. For example, the level of the reference voltage VREF is set to be higher as the numerical value of the VREF code is larger.

The error sampler 23 is included in a data determination circuit 20B. The error sampler 23 operates based on a clock signal CK1, for example, as with the data sampler 21. The error sampler 23 determines whether or not the amplitude of the equalization signal EQS outputted from the equalizer circuit 10 exceeds the reference voltage VREF. The error sampler 23 then transmits the determination result as a digital signal DS3 to a SIPO 30B. The digital signal DS3 includes a plurality of temporally consecutive digital values. The SIPO 30 buffers the digital values of the digital signal DS3 to output the digital values thus buffered to an equalizer controller 51B in a predetermined parallel number.

Other configurations of the receiver device 3B according to the third embodiment are similar to those of the receiver device 3 according to the first embodiment except for the equalizer controller 51B.

[3-2] Reception Method

In the receiver device 3B according to the third embodiment, the equalizer controller 51B adjusts an amount of boost for a CTLE circuit 11 and a level of the reference voltage VREF of the VREF generation circuit 70 based on the digital signals DS1 and DS3.

FIG. 17 is a truth table illustrating an example of a method for adjusting the EQ boost code in the adaptive processing of the receiver device 3B according to the third embodiment. As illustrated in FIG. 17, in the receiver device 3B according to the third embodiment, the equalizer controller 51B adjusts the EQ boost code based on a predetermined data pattern and the amplitude information. FIG. 17 indicates that a data value sampled at a timing of h[0] which is a main cursor is "1", and a data value before n (n ranges from 1 to 3) UI as viewed from the main cursor is "0" or "1". In addition, a value sampled by the error sampler 23 at h[0] is "0" or "1".

Specifically, for example, a digital value of data at h[0] to h[3] is "1111" data and a determination result of the error sampler 23 at h[0] is "1" data, which shows that a level of the current reference voltage VREF is low. In this case, the equalizer controller 51B increments the VREF code (for example, +1).

On the other hand, for example, the digital value of the data at h[0] to h[3] is "1111" data and the determination result of the error sampler 23 at h[0] is "0" data, which shows that the level of the current reference voltage VREF is high. In this case, the equalizer controller 51B decrements the VREF code (for example, −1).

Then, for example, the digital value of the data at h[0] to h[3] is "1000" data and the determination result of the error sampler 23 at h[0] is "1" data, which shows that the current amount of boost is large. In this case, the equalizer controller 51B decrements the EQ boost code (for example, −1).

On the other hand, for example, the digital value of the data at h[0] to h[3] is "1000" data and the determination result of the error sampler 23 at h[0] is "0" data, which shows that the current amount of boost is small. In this case, the equalizer controller 51B increments the EQ boost code (for example, +1).

Further, in a case where the data pattern is in another state at each of the data sample points and error sample points, the equalizer controller 51B does not change the EQ boost code and the VREF code. As described above, the equalizer controller 51E determines whether the amount of boost by the CTLE circuit 11 is insufficient, excessive, or appropriate based on each of information on the data sample points and information on the error sample points (namely, amplitude), and feeds back to the EQ parameter (EQ boost code).

As described above, the equalizer controller 51B according to the third embodiment can use, in the adaptive processing, two types of the pattern filter for adjusting the VREF code and the pattern filter for adjusting the EQ boost code. The equalizer controller 51B according to the third embodiment can dynamically change, in the adaptive processing, either or both of the pattern filters for VREF and EQ according to the EQ boost code.

[3-3] Effects of Third Embodiment

As described above, the receiver device 3 according to the third embodiment can adjust the EQ boost code using the amplitude information of an output signal of the equalizer circuit 10. Then, the receiver device 3 according to the third embodiment executes the adaptive processing as in the first embodiment, so that an effect similar to that of the first embodiment can be obtained.

[4] Fourth Embodiment

The fourth embodiment relates to a use example of the receiver devices 3, 3A, or 3B described in the first to third embodiments. Hereinafter, an information processing system 4 using the receiver devices 3, 3A, or 3B is described as the fourth embodiment.

[4-1] Configuration

Figure 18:
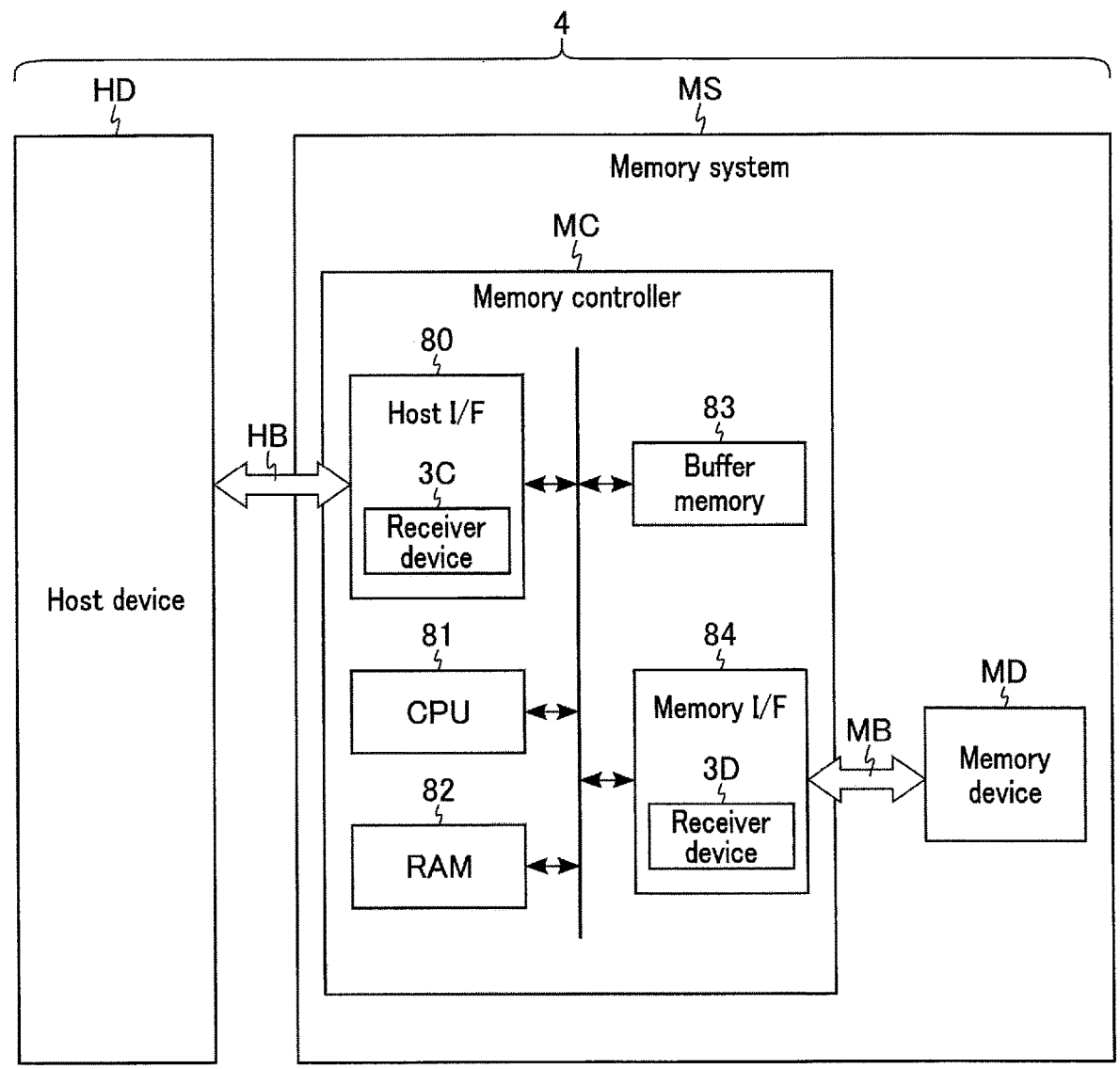
FIG. 18 is a block diagram illustrating an example of a configuration of an information processing system according to a fourth embodiment.

FIG. 18 is a block diagram illustrating an example of the configuration of the information processing system 4 according to the fourth embodiment. As illustrated in FIG. 18, the information processing system 4 includes, for example, a host device HD and a memory system MS. The memory system MS is connectable to the host device HD.

The host device HD is an information processing device external to the memory system MS. The host device HD is, for example, a personal computer or a server installed in a data center. The host device HD transmits various requests to the memory system MS.

The memory system MS is a storage device. The memory system MS is, for example, a memory card such as an SD™ card, a universal flash storage (UFS) device, or a solid state drive (SSD). The memory system MS executes a write operation, a read operation, an erase operation, and the like on data in response to a request from the host device HD. The memory system MS includes, for example, a memory device MD and a memory controller MC.

The memory device MD is, for example, a nonvolatile memory. The memory device MD is, for example, a NAND flash memory. The memory device MD includes a plurality of memory cells to store data in a nonvolatile manner.

The memory controller MC is, for example, an integrated circuit such as a system-on-a-chip (SoC). The memory controller MC controls the memory device MD based on a request from the host device HD. Specifically, the memory controller MC writes data to the memory device MD based on, for example, a write request from the host device HD. The memory controller MC also reads data out of the memory device MD based on a read request from the host device HD. The memory controller MC then transmits the data thus read out to the host device HD.

The memory controller MC includes, for example, a host interface circuit (host I/F) 80, a central processing unit (CPU) 81, a random access memory (RAM) 82, a buffer memory 83, and a memory interface circuit (memory I/F) 84. The function of the memory controller MC described below can be implemented by either a hardware configuration or a combination configuration of hardware resources and firmware.

The host interface circuit 80 is a semiconductor integrated circuit. The host interface circuit 80 manages communication between the memory controller MC and the host device HD. When receiving a request from the host device HD, some circuits of the host interface circuit 80 function as a receiver device 3C corresponding to any one of the receiver devices 3, 3A, and 3B. The receiver device 3C is connected to the host device HD via a host bus BUS. The host bus BUS conforms to, for example, an SD™ interface, a serial attached (SAS) small computer system interface (SCSI), a serial advanced technology attachment (ATA) (SATA), or a peripheral component interconnect express (PCIe™).

The CPU 81 controls the entire operation of the memory controller MC. For example, the CPU 81 issues a write command including a command and an address in response to a write request received from a host device (transmitter device 1). The write command thus issued is transferred to the memory device MD, and the memory device MD executes the write operation based on the write command. The CPU 81 can also execute the read operation in a manner similar to the write operation.

The RAM 82 is, for example, a volatile memory. The RAM 82 is used as a work area of the CPU 81. The RAM 82 stores firmware for managing a plurality of the memory devices MD, various management tables, and the like. As the RAM 82, for example, a semiconductor memory such as a static random access memory (SRAM) or a dynamic random access memory (DRAM) is used. The RAM 82 may be externally connected to the memory controller MC.

The buffer memory 83 is, for example, a volatile memory. The buffer memory 83 is, for example, a static random access memory (SRAM). Data that the memory controller MC has received from the memory device MD, data that the memory controller MC has received from the host device HD, and the like are buffered on the buffer memory 83. The buffer memory 83 may be externally connected to the memory controller MC or may be integrated with the RAM 82.

The memory interface circuit 84 is a semiconductor integrated circuit. The memory interface circuit 84 manages communication between the memory controller MC and the memory device MD. When receiving data from the memory device MD, some circuits of the memory interface circuit 84 function as a receiver device 3D corresponding to any one of the receiver devices 3, 3A, and 3B. The receiver device 3D is connected to the memory device MD via a memory bus MB. The memory bus MB conforms to, for example, a single data rate (SDR) interface, a toggle double data rate (DDR) interface, or an open NAND flash interface (ONFI).

[4-2] Effects of Fourth Embodiment

As described above, the receiver device 3 may be used in the host interface circuit 80 used for communication between the memory system MS and the host device HD, or may be used in the memory interface circuit 84 used for communication between the memory controller MC and the memory device MD. The receiver device 3 may be implemented in the host device HD or the memory device MD. The receiver device 3 may be configured of a plurality of devices or circuits provided on the same printed circuit board, or may be configured of a plurality of devices or circuits provided on different printed circuit boards. As described above, the receiver device 3 is applicable to a device connected to the transmission line 2 having various characteristics. As illustrated in FIG. 18, the host bus BUS and the memory bus MB are examples of the transmission line 2. In either case, the receiver device 3 can shorten the processing time of the adaptive processing with signal compensation accuracy maintained.

[5] Others

The configuration of the receiver device 3 described in the above embodiment is merely an example. For example, the SIPO 30 may be omitted from the receiver device 3. Further, in the above embodiments, the case where a differential signal is inputted to the receiver device 3 is exemplified; however, the present invention is not limited thereto. A single-phase signal may be inputted to the receiver device 3. Even in a case where a single-phase signal is inputted, the equalizer controller 51 operates in a manner similar to the above embodiments, so that the receiver device 3 can obtain an effect similar to that of the above embodiments. In the above embodiments, the case where the voltage level for each pulse corresponds to 1-bit data is exemplified; however, the present invention is not limited thereto. Even in a case where multiple-bits data is assigned to one pulse, the receiver device 3 can obtain an effect similar to that of the first embodiment by dynamically changing the pattern filter as in the first embodiment.

The equalizer controller 51 may be a general-purpose processor such as a central processing unit (CPU), a micro processing unit (MPU), or a graphical processing unit (GPU). Each of the processing described in each embodiment may be implemented by dedicated hardware. For example, the equalizer controller 51 may be an application specific integrated circuit (ASIC) or a programmable logic device (for example, a simple programmable logic device (SPLD), a complex programmable logic device (CPLD), a field programmable gate array (FPGA), or the like). In the operation described in each embodiment, processing executed by software and processing executed by hardware may be mixed, or only one of them may be used.

In the present specification, the voltage at "H" level corresponds to a voltage equal to or higher than a threshold for a case where data is determined by binary values. The voltage at "L" level corresponds to a voltage lower than the threshold for a case where data is determined by binary values. In the present specification, the term "connection" indicates an electrical connection, and does not exclude, for example, the use of another element in between. The device that processes data received by the receiver device 3 may be referred to as a "data processing device". The "adaptive processing" may be referred to as "adaptive control". The data processing device is, for example, the memory controller MC or the memory device MD described in the fourth embodiment.

Although some embodiments of the present invention are described, the embodiments are presented as examples, and are not intended to limit the scope of the invention. The novel embodiments described herein may be embodied in various other forms, and various omissions, substitutions, and changes may be made without departing from the spirit of the invention. The embodiments and modifications thereof are included in the scope and spirit of the invention, and are included in the invention described in the claims and the equivalent scope thereof.

The invention claimed is:

1. A receiver device comprising:
a first equalizer circuit configured to receive a first signal from outside, the first equalizer circuit boosting the first signal to output a resultant as a second signal;
a first sampler circuit configured to sample the second signal, the first sampler circuit outputting a sampling result of the second signal as a first digital signal; and
a control circuit configured to execute adaptive processing for adapting an amount of boost for the first signal by the first equalizer circuit to a loss of the first signal, wherein
in the adaptive processing, the control circuit is configured to:
adjust the amount of boost for the first signal based on inter-symbol interference of a part in the first digital signal, the part matching a data pattern of a set pattern filter; and
dynamically change a pattern filter to be set according to the amount of boost for the first signal.

2. The receiver device of claim 1, wherein
in the adaptive processing, the control circuit is further configured to:
set a first pattern filter in a case where the amount of boost for the first signal is greater than a first threshold; and
set a second pattern filter, different from the first pattern filter, in a case where the amount of boost for the first signal is equal to or less than the first threshold.

3. The receiver device of claim 2, further comprising:
a second sampler circuit configured to sample the second signal, the second sampler circuit outputting a sampling result of the second signal as a second digital signal, wherein the first sampler circuit is further configured to sample the second signal based on a first clock signal, the second sampler circuit is further configured to sample the second signal based on a second clock signal that has the same frequency as frequency of the first clock signal and has a phase different from phase of the first clock signal, and the control circuit is further configured to adjust the amount of boost for the first signal based on e first digital signal and the second digital signal.

4. The receiver device of claim 2, further comprising:

a voltage generator configured to generate a reference voltage; and a third sampler circuit configured to sample the second signal using, as a reference, the reference voltage at the same timing as the first sampler circuit, the third sampler circuit outputting a sampling result of the second signal as a third digital signal, wherein in the adaptive processing, the control circuit is further configured to adjust a level of the reference voltage of the voltage generator and the amount of boost for the first signal based on the first digital signal and the third digital signal.

5. The receiver device of claim 1, wherein the first equalizer circuit includes a continuous time linear equalizer circuit.

6. The receiver device of claim 5, further comprising:

a decision feedback equalizer configured to compensate for the second signal based on a tap coefficient, wherein, in the adaptive processing, the control circuit is further configured to adapt the tap coefficient to the loss of the first signal.

7. The receiver device of claim 1, further comprising:

a second sampler circuit configured to sample the second signal, the second sampler circuit outputting a sampling result of the second signal as a second digital signal, wherein the first sampler circuit is further configured to sample the second signal based on a first clock signal, the second sampler circuit is further configured to sample the second signal based on a second clock signal that has the same frequency as frequency of the first clock signal and has a phase different from phase of the first clock signal, and the control circuit is further configured to adjust the amount of boost for the first signal based on the first digital signal and the second digital signal.

8. The receiver device of claim 7, wherein, in the adaptive processing, the control circuit is further configured to adjust the amount of boost for the first signal based on a sampling result of two sample points, and the two sample points sandwich a main cursor of a part in the second digital signal, the part in the second digital signal matching the pattern filter set for the first digital signal.

9. The receiver device of claim 1, further comprising:

a voltage generator configured to generate a reference voltage; and a third sampler circuit configured to sample the second signal using, as a reference, the reference voltage at the same timing as the first sampler circuit, the third sampler circuit outputting a sampling result of the second signal as a third digital signal, wherein, in the adaptive processing, the control circuit is further configured to adjust a level of the reference voltage of the voltage generator and the amount of boost for the first signal based on the first digital signal and the third digital signal.

10. The receiver device of claim 9, wherein, in the adaptive processing, the control circuit is further configured to adjust the level of the reference voltage of the voltage generator and the amount of boost for the first signal based on a sampling result of a main cursor of a part in the third digital signal, the part in the third digital signal matching a third pattern filter.

11. A reception method of a receiver device comprising:

boosting a first signal received from outside;

sampling a second signal to generate a first digital signal, the second signal being the boosted first signal; and executing adaptive processing for adapting an amount of boost for the first signal to a loss of the first signal;

the adaptive processing comprising:

adjusting the amount of boost for the first signal based on inter-symbol interference of a part in the first digital signal, the part matching a data pattern of a set pattern filter; and changing dynamically a pattern filter to be set according to the amount of boost for the first signal.

12. The reception method of claim 11, wherein the adaptive processing further comprising:

setting a first pattern filter in a case where the amount of boost for the first signal is greater than a first threshold; and setting a second pattern filter, different from the first pattern filter, in a case where the amount of boost for the first signal is equal to or less than the first threshold.

13. The reception method of claim 12, further comprising:

sampling the second signal based on a first clock signal to generate the first digital signal;

sampling the second signal based on a second clock signal to generate a second digital signal, the second clock signal having the same frequency as frequency of the first clock signal and has a phase different from phase of the first clock signal; and adjusting the amount of boost for the first signal based on the first digital signal and the second digital signal.

14. The reception method of claim 12, further comprising:

sampling the second signal using, as a reference, a reference voltage at the same timing as sampling the second signal to generate a third digital signal; and adjusting a level of the reference voltage and the amount of boost for the first signal based on the first digital signal and the third digital signal.

15. The reception method of claim 11, wherein boosting the first signal includes boosting the first signal by a continuous time linear equalizer circuit.

16. The reception method of claim 15, further comprising:

compensating for the second signal based on a tap coefficient; and adapting the tap coefficient to the loss of the first signal.

17. The reception method of claim 11, further comprising:

sampling the second signal based on a first clock signal to generate the first digital signal;

sampling the second signal based on a second clock signal to generate a second digital signal, the second clock signal having the same frequency as frequency of the first clock signal and has a phase different from phase of the first clock signal; and adjusting the amount of boost for the first signal based on the first digital signal and the second digital signal.

18. The reception method of claim 17, the adaptive processing further comprising:

adjusting the amount of boost for the first signal based on a sampling result of two sample points, wherein the two sample points sandwich a main cursor of a part in the second digital signal, the part in the second digital signal matching the pattern filter set for the first digital signal.

19. The reception method of claim 11, further comprising:
sampling the second signal using, as a reference, a reference voltage at the same timing as sampling the second signal to generate a third digital signal; and
adjusting a level of the reference voltage and the amount of boost for the first signal based on the first digital signal and the third digital signal.

20. The reception method of claim 19, the adaptive processing further comprising:
adjusting the level of the reference voltage and the amount of boost for the first signal based on a sampling result of a main cursor of a part in the third digital signal, the part in the third digital signal matching a third pattern filter in the third digital signal.

* * * * *